Figure 1:
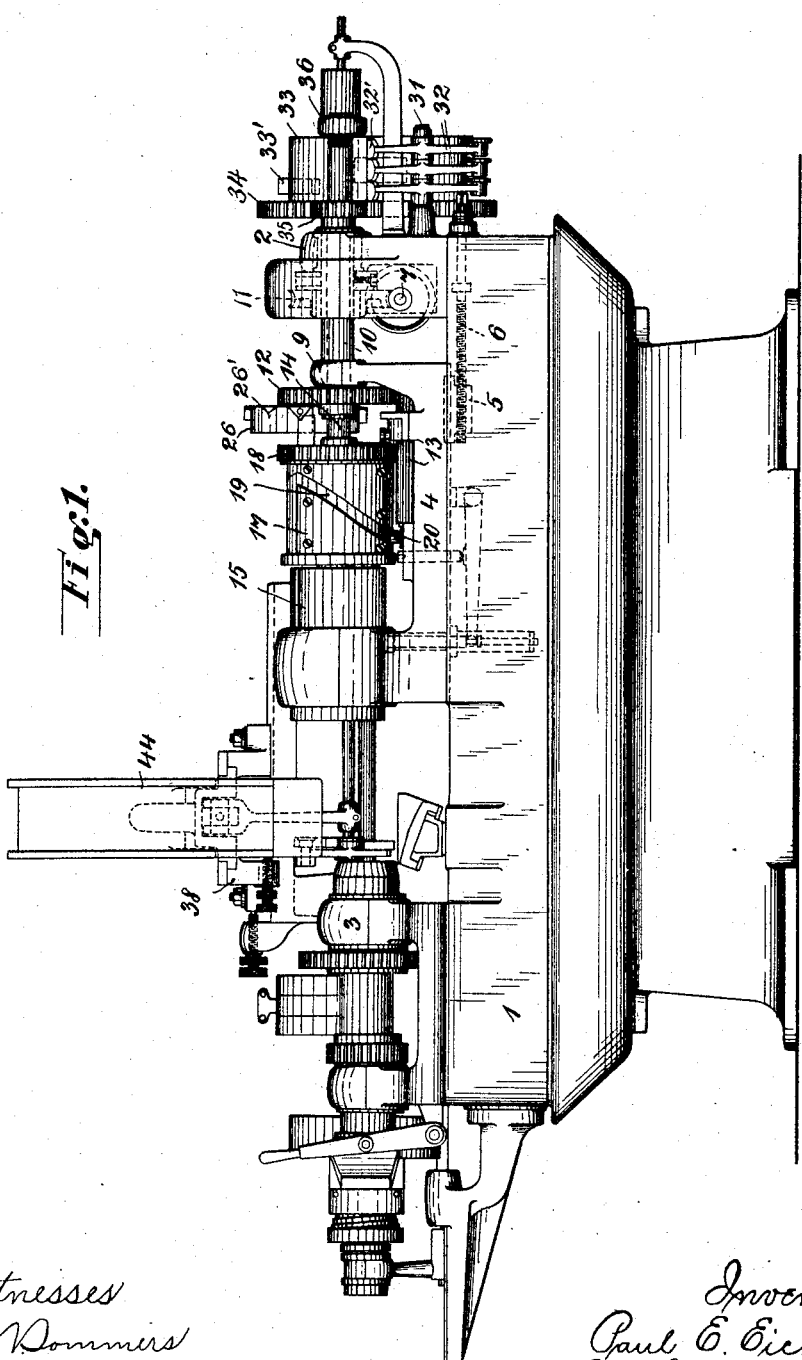

P. E. EICHLER.
AUTOMATIC TURRET LATHE.
APPLICATION FILED MAR. 5, 1915.

1,199,252.

Patented Sept. 26, 1916.
7 SHEETS—SHEET 1.

Witnesses
B. Dommers
E. Leckert

Inventor,
Paul E. Eichler
By
Atty

P. E. EICHLER.
AUTOMATIC TURRET LATHE.
APPLICATION FILED MAR. 5, 1915.
1,199,252.
Patented Sept. 26, 1916.
7 SHEETS—SHEET 2.
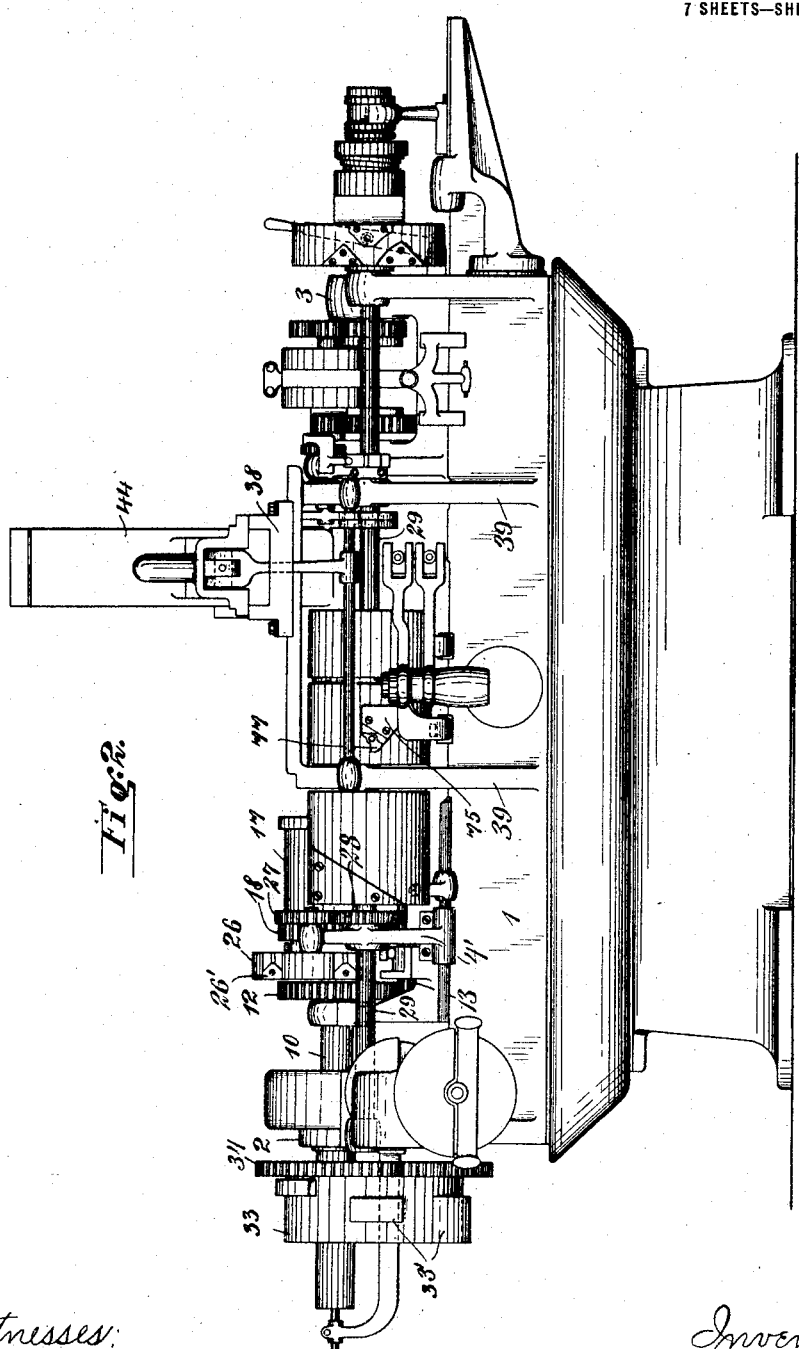

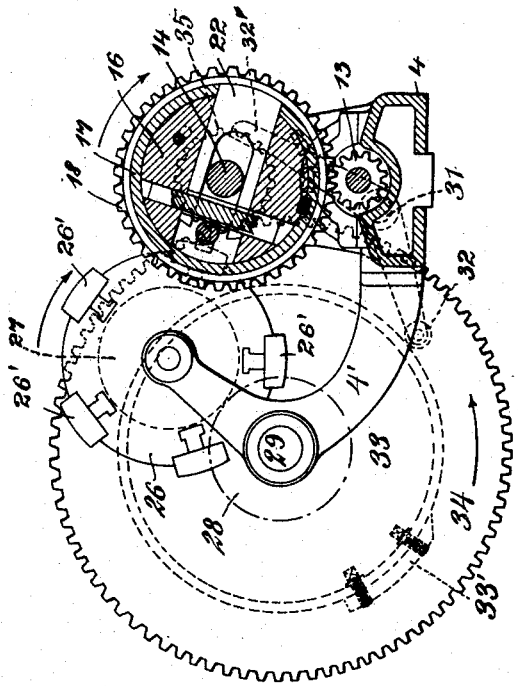
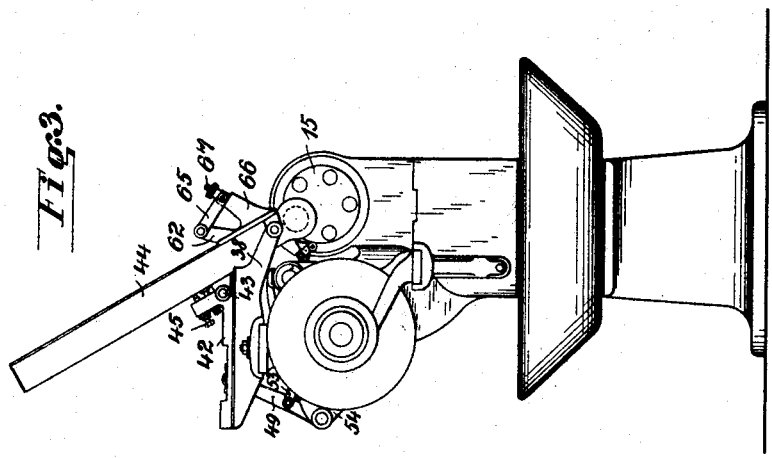

P. E. EICHLER.
AUTOMATIC TURRET LATHE.
APPLICATION FILED MAR. 5, 1915.

1,199,252.

Patented Sept. 26, 1916.
7 SHEETS—SHEET 4.

Witnesses
B. Dommers
E. Leckert

Inventor
Paul E. Eichler,
By
atty.

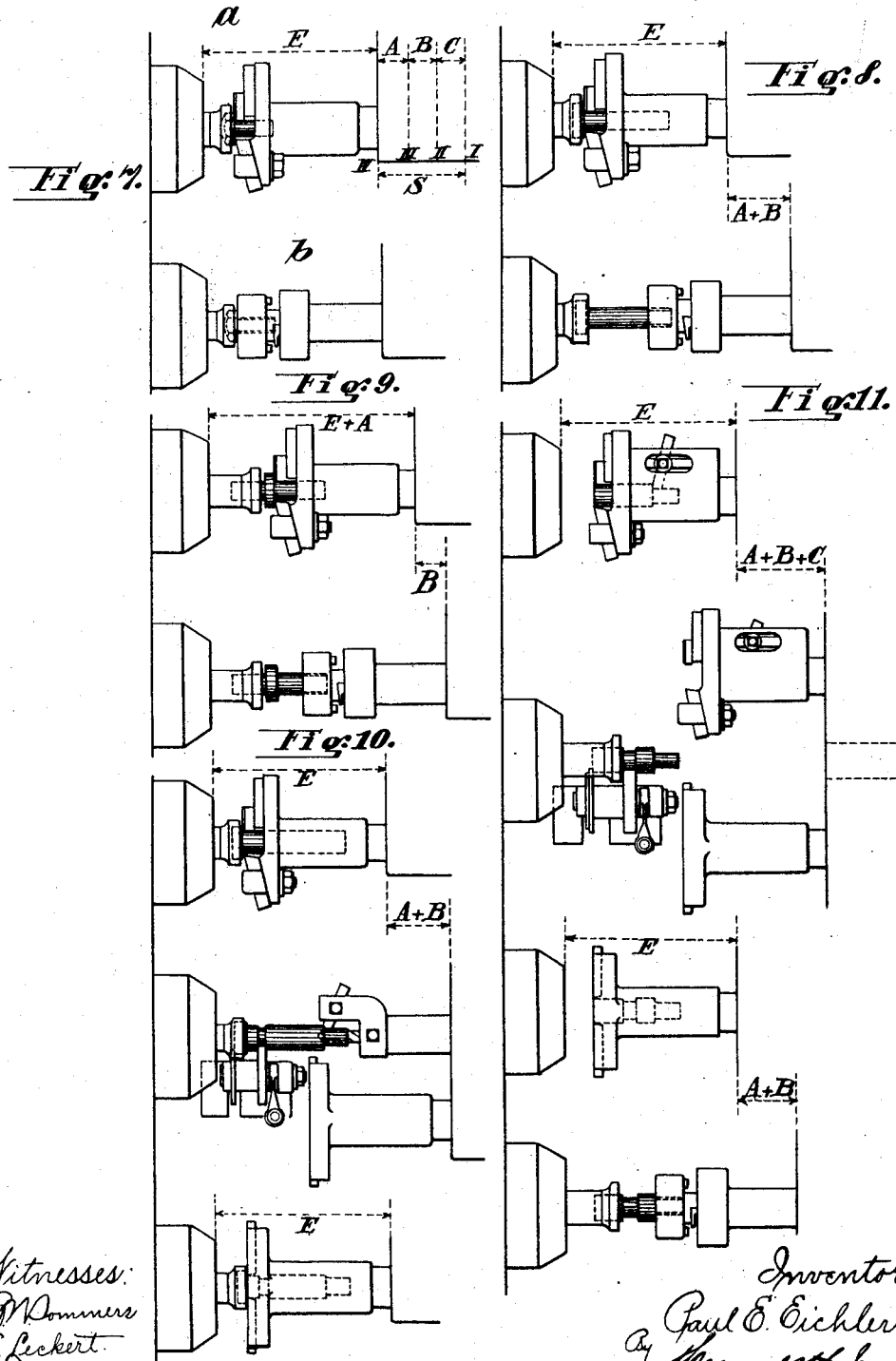

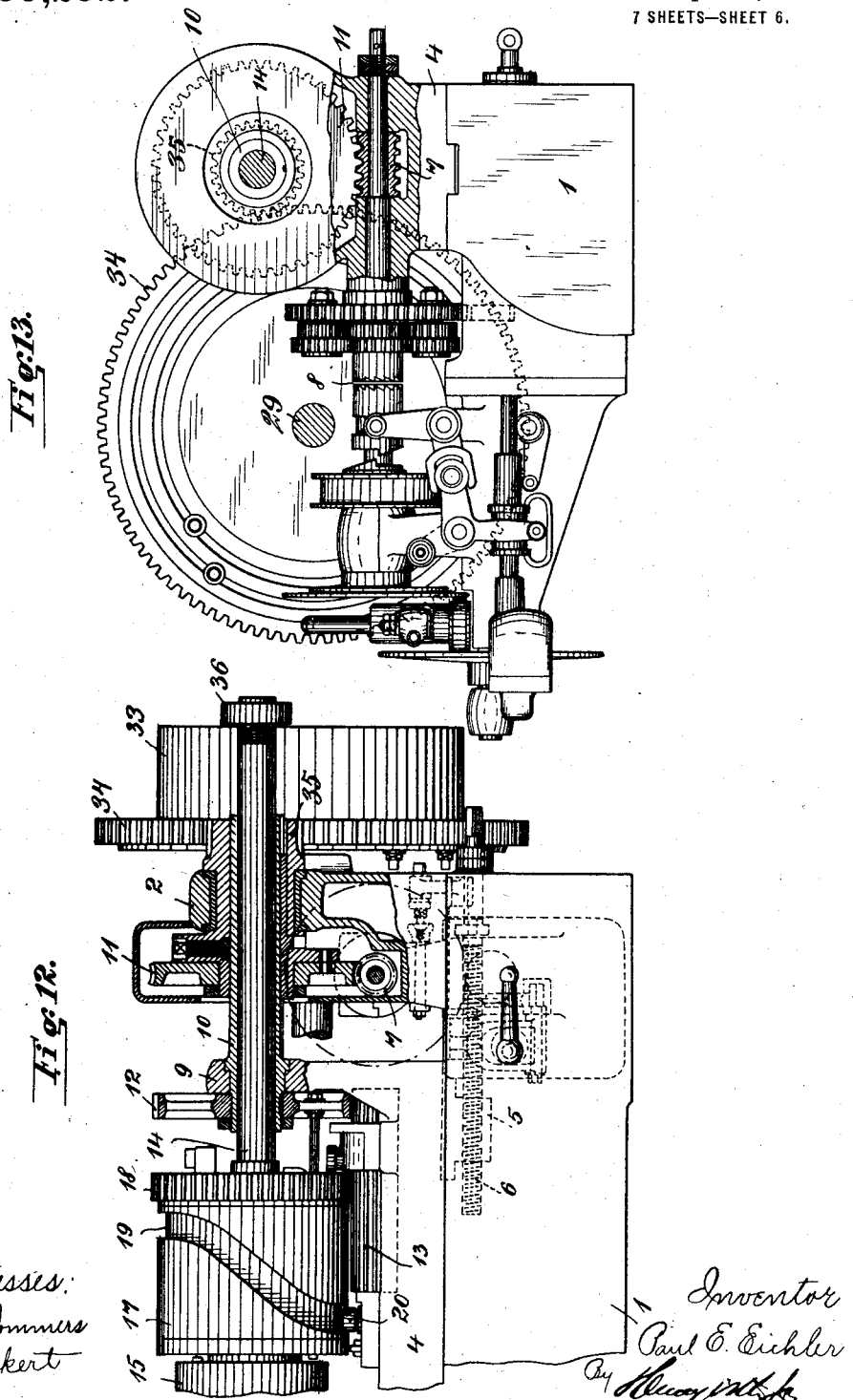

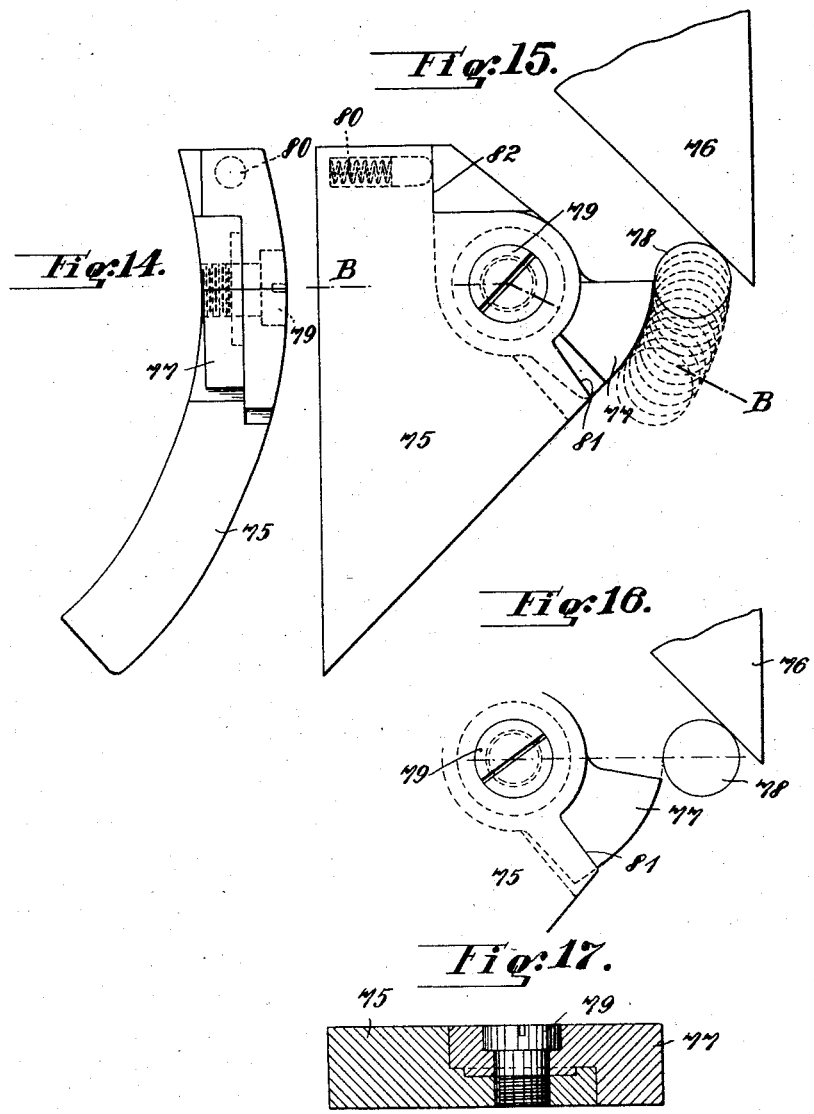

UNITED STATES PATENT OFFICE.

PAUL EMIL EICHLER, OF CHEMNITZ, GERMANY, ASSIGNOR TO THE FIRM OF SCHUBERT & SALZER MASCHINENFABRIK, AKTIENGESELLSCHAFT, OF CHEMNITZ, GERMANY.

AUTOMATIC TURRET-LATHE.

1,199,252.   Specification of Letters Patent.   Patented Sept. 26, 1916.

Application filed March 5, 1915. Serial No. 12,363.

*To all whom it may concern:*

Be it known that I, PAUL EMIL EICHLER, a citizen of the German Empire, residing at Chemnitz, in the Kingdom of Saxony, Germany, have invented certain new and useful Improvements in Automatic Turret-Lathes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to automatic turret lathes and more especially to the means for varying the forward feed of the turret for the purpose of adapting it to work pieces and to tools of different size, the object of my invention being to increase the capacity and exactitude of working and to avoid the drawbacks connected with former machines of this kind.

In the lathe according to this invention an arrangement is provided for varying the forward feed of the turret. In automatic turret lathes, as a rule, the turret executes a number of partial rotations according to the number of tools. Between each two partial rotations the displacing drum connected with the turret will move the turret and the tool toward the work piece and back again, each displacement and intermittent rotative movement being caused by one revolution of the drum and the distance traveled by the turret being always the same. This arrangement, however, presents a serious drawback. The distance traveled to and fro by the turret being always the same, tools of different length had to be prepared for work pieces of different length. Moreover these tools very frequently collided with the tool of the parting slide. The arrangement according to the present invention does away with these drawbacks and renders the use of special tools of different length for different feed distances unnecessary by allowing the feed to be adjusted in accordance with each individual working phase.

The turret slide itself can be displaced axially so as to be adjusted to work pieces of a certain length. The turret arrangement heretofore employed presented the drawback of having one of the turret shaft bearings located behind the driving wheel so that the turret slide had to pass underneath the driving wheel and the worm in gear with it. In consequence thereof the radius of the driving wheel had to be kept below a certain length, although said wheel has to transmit the power required for operating the whole lathe. Moreover the transmission gear from the controlling wheel had to be made very long on account of one of the movable bearings being located between the driving wheel and the controlling wheel and requiring a certain space for its movements. All these difficulties are overcome by the present arrangement.

The cam slot for the forward feed of the parting slide also differs from the cam slots provided in the older lathes in that in the cam slots hitherto employed the cam pin or roller guided therein after having reached the apex of the slot, in order to start in the opposite direction, had to pass around the apex, thus losing time. In contradistinction to this the cam slot according to this invention is arranged in such a manner as to avoid this loss of time.

In the drawings accompanying the specification the preferred form of an automatic turret lathe according to my invention is shown.

Figure 4:
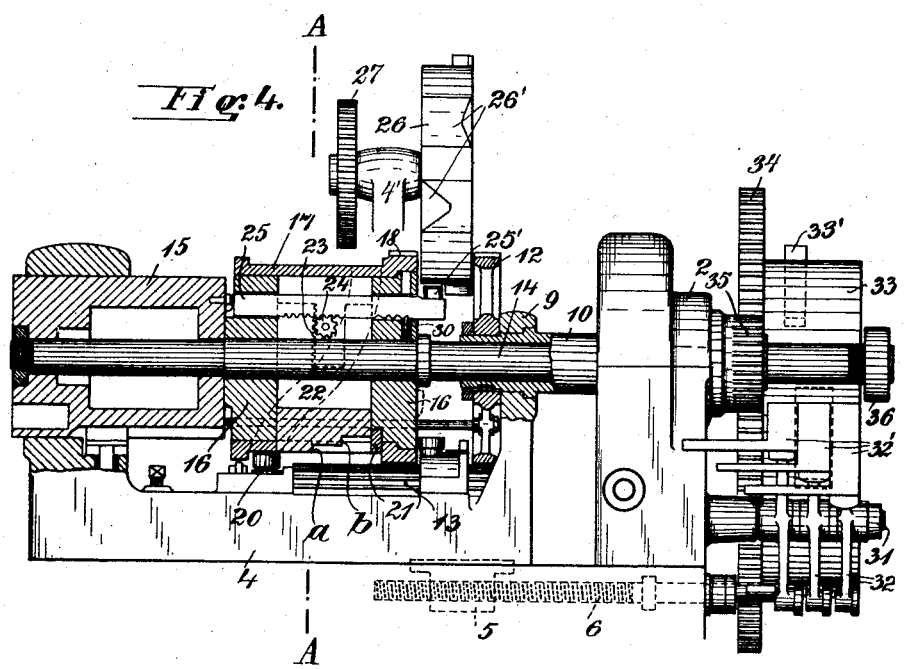
Figure 5:
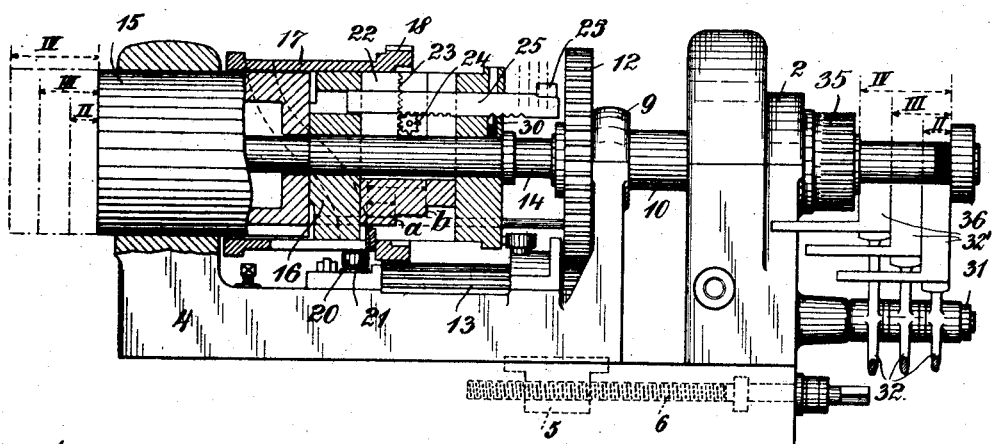

Figures 1 and 2 show the lathe as viewed from opposite sides, Fig. 3 is an end view. Fig. 4 is a vertical longitudinal section (on a larger scale) through the device for varying the turret feed. Fig. 5 shows the same device, also in vertical longitudinal section, in a different position of parts. Fig. 6 is a vertical cross section on the lines A—A (Fig. 4.) Figs. 7 to 11 are diagrammatic views of different relative positions of working pieces and the turret and tools, showing the advantages gained by making the turret feed variable. Fig. 12 is a side view, partly in vertical section, and Fig. 13 is an end view, of the device for axially displacing the turret slide. Figs. 14 to 17 show the new return cam, for the parting slide feed, Fig. 14 being a side view, Figs. 15 and 16 front views showing the movable part of the cam in two different positions. Fig. 17 is a cross section on the line B—B of Fig. 15.

1 is the lathe bed, 2 and 3 are the main bearings. 4 is the turret slide guided in suitable guides of the lathe bed between the bearings.

5 is a projection on the bottom face of the slide provided with a screw-threaded perforation, 6 is the feed screw located in the lathe bed, one end engaging with the projection 5, while the other end projects sidewise from the lathe bed and can be provided with a crank handle. Close to the bearing 2 the driving worm 7 (Figs. 12 and 13) and the reversing mechanism are located.

10 is a hollow shaft rotatably located in a bearing 9 of the slide 4 and extending through bearing 2.

11 is the driving wheel fixed on shaft 10 and gearing with worm 7.

12 is a toothed wheel fixed on the inner end of shaft 10 and gearing with a toothed cylinder 13. Within the hollow shaft 10 there is located the shaft 14 carrying the turret 15. Next to the turret a drum 16 is arranged carrying a loose sleeve 17 with a toothed wheel 18 rigidly fastened to it, said toothed wheel gearing with the toothed cylinder 13.

19 is the cam slot on sleeve 17, 20 is a cam roller running in said slot and fastened to slide 4.

21 is an abutment at the bottom of sleeve 17.

Within a vertical slot of the drum 16 a gliding piece 22 is arranged, said gliding piece being forked crosswise so as to embrace the shaft 14 as well as a toothed cylinder 24 extending across said shaft. The arms on one side of said gliding piece are provided with internal gearing 23 and are in gear with the toothed cylinder 24. A rack 25 within drum 16 extending horizontally across said drum and parallel with shaft 14 is likewise in gear with the toothed cylinder 24.

The slide 4 carries a rearward and upwardly extending arm 4' (Fig. 6) in the upper end of which is journaled a shaft having a disk 26 fixed on one end and a gear 27 fixed on the opposite end. The disk 26 has a plurality of cam blocks 26' removably mounted in its periphery, said disk being so positioned relatively to the rack 25 that the cam blocks 26' will, when the disk is rotated as hereinafter described, engage a lug 25' on the free end of rack 25 and shift the latter alternately in opposite directions. The gear 27 meshes with a gear 28 on a secondary shaft 29 (Figs. 2 and 6) which is driven from the shaft 10 as hereinafter described. A spring-actuated lock pin 30 arranged in the drum 16 below the rack tends to keep it locked in its position. Two stops, $a$, $b$ are formed on the bottom part of gliding piece 22, so that in all three vertical stops are provided in the path of abutment 21.

Pivoted on a shaft 31, at the end of the lathe bed, are three bell-crank levers having their lower arms 32 resting against the periphery of a drum 33 in the path of cams 33' mounted in said periphery. This drum 33 is fixed on shaft 29 on which is fixed a gear 34 in mesh with a gear 35 fixed on shaft 10. As the drum 33 rotates, an arm 32 of a bell-crank lever lying in the path of one of the cams 33 is depressed by the latter and the free arm 32' of the depressed lever is moved toward the turret shaft 14 and in front of a flange or stop 36 on the end of said shaft thus limiting the axial movement of the latter and of the turret.

The operation of the device described above is as follows: According to the number of stops arranged on gliding piece 22, the turret is free to assume four different positions; it can either assume its position of rest shown in Fig. 5 or else be fed to the left the distance between the outer edges of the gliding piece 22. It can further assume two intermediate positions governed by the stops $a$ and $b$ on the bottom face of gliding piece 22. By causing the stops 26' on disk 26 to act upon the projection 25' on rack 25 this latter is shifted either to the left or to the right. By shifting the rack to the right from the position shown in Fig. 4 the toothed cylinder 24 is rotated and the gliding piece 22 in gear with it is lifted. According to the lifting distance either stop $b$ or stop $a$ are carried in the path of stop 21, or else the gliding piece 22 as a whole is lifted out of way, as shown in Fig. 5 thus allowing the stop 21 and the sleeve 17, of which it forms part, to advance without carrying drum 16 and turret 15 along, the cam roller 20 causing said sleeve rotated under the action of gears 2, 3, 4, 5, 6 to be displaced in longitudinal direction. In order to prevent the drum 16 from unintentionally following the longitudinal movement of sleeve 17, either by friction or from other causes, the cam 33' on drum 33, which corresponds to the stop 26' acting on rack 25, causes either one of the three bell-crank levers to be carried in the path of stop 36 on shaft 14 and to lock the shaft and the turret fixed to it against horizontal displacement. In the case of it being intended to feed the turret forward the full distance, no cam acts on the levers 32 and the shaft 14 is then free to be displaced the full distance also. Whenever gliding piece 22 assumes its lowest position (Fig. 4) the sleeve 17 on being rotated by gears 2, 3, 4, 5, 6 will, in riding on cam roller 20 and being shifted to the left, take with it drum 16 coupled with it by stop 21, and the turret 15 will be carried into the foremost position shown on the left hand side of Fig. 5 as IV. The two intermediate positions are controlled by the steps $a$ and $b$ on gliding piece 22 and the left hand and middle levers 32 respectively. The disk 26 carrying the stops 26' is so connected with the feed mechanism as to be always rotated in time into the desired position. The stops 26' are removably fixed on it and can be adjusted to suit all requirements of each individual case. Of course the stops on drum 33 have to be adapted to the position of stops on disk 26.

Figs. 7 to 11 show the mode of working of the variable feed arrangement. S is the distance traveled by the turret in moving from the forward position IV to the rearward position I, after having passed through the intermediate positions III and II, this distance being composed of the part distances A, B, and C. E is the shortest distance possible between the turret and the chuck.

Fig. 7 shows the turning off of a profiled piece provided with screw thread (screw bolt). At a the turret in its most forward position is working the work piece with the roughing tool; at b the bolt is screw threaded with the screw cutting tool. The distance between the turret and the chuck is the same in both cases.

In Fig. 8 the working of another cylindrical screw threaded work piece (fish bolt) is shown. The turret is in its foremost position while the roughing tool is at work; in order to cut the screw thread the turret is moved back the distance A+B.

Fig. 9 shows the turning-off of a cylindrical piece with a projecting flange in the middle and screw threads at one end (cap screw). During the roughing operations the turret is moved backward the distance A, while in order to cut the screw threads it is moved farther backward the distance B.

Fig. 10 shows a profiled piece having a head, a circumferential groove and internal thread (profiled shaft). During the roughing the turret is in its foremost position. It is then moved back the distance A+B, its end being simultaneously turned off farther and bored out with a drill. At the same time a profiling tool and a flat finishing tool fixed to the parting slide are at work. In the position now following the turret is shifted again into its foremost position in order to be worked by gaging tools.

Fig. 11 shows the turning off of a cylindrical piece having a circumferential groove and a screw threaded shoulder. During the working of the roughing tool the turret is in its foremost position, is then shifted into the rearmost position (A+B+C) in order to allow its passing the parting slide in being turned. The parting slide tool then works together with the profiling tool and the flat finishing tool; after its return the turret advances into the foremost position to work the work piece with the gaging tools and is then moved back the distance A+B in order to cut the thread with the thread cutting tools.

When the turret slide 4 is displaced as a whole by turning the crank handle (not shown) fixed on the free end of screw 6, merely the parts fixed to the slide and the sleeve 10 are displaced with it, this latter part forming the working connection between the other parts on the slide and the stationary driving and reversing gear.

The work piece magazine 44 is arranged on a track 38 carried by arms 39 fixed to the lathe bed.

The improved cam slot shown in Figs. 14 to 17 comprises two fixed parts 75, 76 and a movable part 77. In order to allow the cam roller 78 to pass around the corner of the cam slot and to effect the change of direction without any loss of time, the corner part of the guide piece 75 being the first to coact with the cam roller is rendered movable and elastic and adapted to give way under the pressure exerted upon it by the cam roller. To this end the corner part 77 is pivotally connected with the main guide piece 75 forming the first half of the cam slot, the parts being assembled by a screw 79. The movable corner part 77 has the form of a segment and presents to the cam roller a curved guide surface. The guiding edge of the cam piece 76 is directed about at a right angle to the edge of cam piece 75. Part 77 is pressed by a spring 80 against the edge 81 of part 75; the edge 82 limits the movement of part 77.

The roller 78 gliding up the guide edge of cam piece 75 passes on to the curved edge of part 77. As soon as it touches part 77, the friction created between the two parts causes part 77 to be carried along and to oscillate around the pivot 79, the spring 80 being compressed, until it strikes the edge 82. During this time the roller has struck the edge of part 76 crossing its path and in meeting its resistance releases part 77 which is oscillated into its initial position by the spring 80. In returning to this position it clears the way for the cam roller which can then move on in an opposite direction without any loss of time.

I claim:

1. In an automatic turret lathe, in combination, a turret adapted to be displaced axially, a sleeve adapted to be displaced axially and independently from said turret, means for coupling said sleeve and said turret and means for varying the coupling conditions between said sleeve and said turret to vary the longitudinal movement of the latter.

2. In an automatic turret lathe, in combination, a turret adapted to be displaced axially, a sleeve adapted to be displaced axially and independently from said turret, means for coupling said sleeve and said turret and adjustable means for varying the coupling conditions between said sleeve and said turret.

3. In an automatic turret lathe, in combination, a turret adapted to be displaced axially, a sleeve adapted to be displaced axially and independently from said turret, a cam slot on said sleeve, a cam pin on the lathe bed in gear with said slot and adjustable means for coupling said sleeve and said turret.

4. In an automatic turret lathe, in combination, a turret adapted to be displaced axially, a sleeve adapted to be displaced axially and independently from said turret, a plurality of stops connected with said turret and adapted to be displaced vertically within said sleeve and an abutment on said sleeve adapted to strike one of said stops when the sleeve is being displaced.

5. In an automatic turret lathe, in combination, a turret adapted to be displaced axially, a sleeve adapted to be displaced axially and independently from said turret, means for coupling said sleeve and said turret and means for preventing said turret from being displaced unintentionally by said sleeve.

6. In an automatic turret lathe, in combination, a turret shaft adapted to be displaced axially, a turret fixed on said shaft, a sleeve arranged coaxially to said turret and adapted to be displaced axially and independently from said turret shaft, a shaft parallel to said turret shaft, a cam disk on the parallel shaft and stops adapted to be moved by said cam disk into the path of said turret shaft.

7. In an automatic turret lathe, in combination, a turret shaft, a bearing for said shaft adapted to be displaced axially on the lathe bed, a hollow shaft surrounding said turret shaft, driving gear on said hollow shaft, means for coupling said driving gear and said hollow shaft without however preventing relative axial displacement and means for transmitting rotation from said hollow shaft to said turret shaft.

8. In an automatic turret lathe, in combination, a parting tool slide, a lever adapted to impart to said slide a reciprocating motion, a cam pin on said lever, a drum opposite said cam pin, two cam guide pieces on said drum adapted to guide said cam pin in an angular path and a movable corner piece pivoted to the first cam piece in the apex of the angle and adapted to be oscillated by the cam pin passing over it and to swing back after it has passed.

In testimony that I claim the foregoing as my invention, I have signed my name in presence of two subscribing witnesses.

PAUL EMIL EICHLER. [L. S.]

Witnesses:
T. E. STEGER,
W. H. MÜCKE.